United States Patent [19]

Bell, Jr.

[11] Patent Number: 5,573,321

[45] Date of Patent: Nov. 12, 1996

[54] ACCESS FRAME FOR ELECTRICAL ENCLOSURE

[76] Inventor: George W. Bell, Jr., 1529 Woolfolk Rd., Fort Valley, Ga. 31030

[21] Appl. No.: 493,260

[22] Filed: Jun. 21, 1995

[51] Int. Cl.⁶ .................................................. A47B 67/02
[52] U.S. Cl. ........................ 312/242; 312/245; 312/223.1; 174/48; 361/796; 361/829
[58] Field of Search ..................................... 312/242, 245, 312/223.1; 174/48, 50; 361/796, 752, 832, 829, 797

[56] References Cited

U.S. PATENT DOCUMENTS

| | | | |
|---|---|---|---|
| 1,164,349 | 12/1915 | Hotchkin . | |
| 1,748,234 | 2/1930 | Loeb | 312/242 X |
| 2,345,792 | 4/1944 | Cann | 174/50 |
| 3,610,717 | 10/1971 | Van Nostrand | 312/242 |
| 3,618,804 | 11/1971 | Krause | 174/50 |
| 3,679,868 | 7/1972 | England | 219/368 |
| 3,681,663 | 8/1972 | Albers | 174/50 X |
| 3,983,311 | 9/1976 | Brumfield et al. | 174/50 |
| 4,336,569 | 6/1982 | Tsuda et al. | 361/752 X |
| 4,572,391 | 2/1986 | Medlin | 220/3.9 |
| 4,931,909 | 6/1990 | Backes | 361/752 |
| 5,001,602 | 3/1991 | Suffi et al. | 361/829 X |
| 5,422,946 | 6/1995 | Delakowitz et al. | 361/829 X |
| 5,430,248 | 7/1995 | Levy | 174/50 |

Primary Examiner—Peter M. Cuomo
Assistant Examiner—Stephen Vu
Attorney, Agent, or Firm—Jones & Askew

[57] ABSTRACT

An access frame for use with an electrical enclosure, and an electrical enclosure having an access frame, of the type used in a hollow wall structure to facilitate installing additional wiring into the electrical enclosure after a wall panel of the hollow wall structure is installed about the electrical enclosure. The access frame includes a mount selectively engagable with the electrical enclosure adjacent an edge of an enclosure sidewall, support legs attached to the mount and extending therefrom and an elongate support bar supported in spaced apart relation to an edge of an enclosure sidewall by the support legs. The access frame defines an access opening extending between the support legs and the support bar and the sidewall edge. The access opening facilities installing wire clamps having a wire clamp passageway in knockout apertures defined in the enclosure side wall. The access opening also facilitates inserting wiring located external to the enclosure within the hollow wall structure through the wire clamp passageway.

6 Claims, 4 Drawing Sheets

//5,573,321

ACCESS FRAME FOR ELECTRICAL ENCLOSURE

TECHNICAL FIELD

The present invention relates generally to electrical enclosures and more particularly to an electrical enclosure for use in a hollow wall structure and provided with an access frame for providing access to external portions of the electrical enclosure to facilitate running wiring into the electrical enclosure.

BACKGROUND OF THE INVENTION

Electrical load centers of the type adapted to be mounted in a hollow wall structure, comprising a generally rectangular metallic enclosure box and an enclosure cover, are in common use in most residential and some commercial buildings. A prior art load center 2 is shown installed in a hollow wall structure 12 in FIG. 1.

The hollow wall structure 12 comprises, generally, a plurality of vertically disposed studs 14 and a wall panel 16 attached to the studs by fasteners 18. A common wall panel 16 is gypsum "drywall" which is nailed or screwed to the studs 14. Established building practice and many building codes require standard spacing between wall studs, typically sixteen inches center-to-center.

The prior art electrical load center 2 includes an enclosure box 3 and an enclosure cover 4. The enclosure box 3 is mounted between a pair of adjacent studs 14. A high voltage/high current service wire, SW, originating at a utility pole or underground distribution service, is terminated at the load center 2 and is electrically connected to a circuit distribution assembly CD. Lower voltage/current circuit wires CW are electrically connected to the circuit distribution assembly CD and extend from the enclosure box 3. The service wire SW and the circuit wires CW extend through an enclosure sidewall 5 through sidewall apertures 6, commonly referred to as "knock-out" apertures. The service and circuit wires, SW and CW, respectively, are secured against movement by wire clamps 7 that are inserted in the sidewall apertures 6 and secured to the sidewall 5.

During new building construction, all electrical wiring is installed and connected at the load center 2 before the wall panel 16 is installed. Then, the wall panel 16 is installed adjacent the load center box 3 by providing a wall panel cut-out 8 having dimensions only slightly greater, approximately 1/8–1/4 inch, than the outside dimensions of the enclosure box 3. Because the clearances between the edges of the cutout 8 and the enclosure box 3 are so narrow, there is substantially no access to exterior surfaces of the enclosure box, such as the exterior surface of the upper and lower sidewalls 5, after the wall panel 16 has been installed.

After the wall panel 16 is installed, the cover 4 is installed by attaching it with screws to the enclosure box 3. The cover 4 is sized and configured so that it overlays slightly the wall panel 16 adjacent the edges of the cut-out 8 to give a neat appearance.

When new facilities, which require electrical service that exceeds the capacity of the installed electrical circuit cable, are installed in an existing building, it becomes necessary to "pull in" new electrical wiring to provide electrical service to the new facilities. This requires installing electrical circuit wire CW from the electrical load center 2 to the new facility. The installation of new circuit wire CW into the load center enclosure box 3 is complicated because the exterior of the enclosure box is no longer accessible after the wall panel 16 is installed. Electrical codes require that cable clamps 7 be installed in spare sidewall apertures 6 and new wire passed through and secured by the cable clamps. It is difficult, if not impossible, to install a new cable clamp 7 because part of the cable clamp must be installed from the exterior sidewall surface which is not accessible because of the close fit of the wall panel 16 about the enclosure box 3. Also, it is difficult to insert the end of the new circuit wire CW, now positioned within the hollow wall structure behind the wall panel 16, through the cable clamp 7 installed in the sidewall aperture 6 because of the inaccessibility of the wire end. This condition may require the electrician to "fish" for the circuit wire cable end with a special tool from inside the enclosure box 3.

To overcome these problems associated with installing new wiring in an existing building, electricians will oftentimes break away portions of the wall panel 16 adjacent the enclosure box 3 edge to provide access to the external sidewall surfaces of the enclosure box. This allows the electrician to install a new cable clamp 7 and to insert the end of the new circuit wire CW through the new wire clamp. Because the wall panel has been damaged by the procedure, repair of the wall panel is necessitated. Alternatively, the installer may simply avoid installing the wire clamp 7 and secure the new circuit wire CW by other means within the enclosure, or leave the new circuit wire CW unsecured.

Accordingly, there is a need for a means for providing access to external sidewall surfaces of load center enclosure boxes to facilitate the installation of electrical cable into an installed load center enclosure surrounded by a wall panel without removing any portions of the wall panel or damaging the wall panel.

SUMMARY OF THE INVENTION

The foregoing problems associated with installing new wire cable in a previously installed load center enclosure surrounded by panel material have been overcome by providing an access frame, and an electrical enclosure comprising an access frame, which provides access to external sidewall surfaces of the load center enclosure box to facilitate the installation of new cable clamps and new electrical wire cable into an installed load center enclosure surrounded by a wall panel without removing any portion of the wall panel or damaging the wall panel.

The access frame and electrical enclosure of the present invention provide an access opening adjacent the enclosure box sufficient to provide convenient access or exposure to the exterior surface of the enclosure sidewalls for the purpose of installing a cable clamp and inserting a new circuit wire cable through the wire clamp and securing the wire clamp about the circuit wire.

Generally described, a preferred embodiment of the access frame of the present invention includes a frame mount, support legs attachable to the electrical enclosure box by the frame mount and an elongate support bar supported by the support legs in spaced apart relation to the enclosure box. Wall panel material defining a cut-out is mounted about the enclosure such that at least one edge of the cut-out is disposed in overlying engagement with the support bar, spaced-apart from the enclosure sidewall. An enclosure cover is sized and configured to overlay the enclosure opening and the access opening so as to cover them to give a neat appearance and to prevent infiltration of contaminants, rodents or insects.

Therefore, it is an object of the present invention to provide a convenient means for facilitating running new electrical wire cable into an existing electrical enclosure.

It is a further object of the present invention to provide a means for facilitating running new electrical wire cable into an existing electrical enclosure surrounded by wall panel material without damaging the surrounding wall panel material.

It is still another object of the present invention to provide an electrical enclosure adapted to provide a convenient means of running new electrical wire cable into the electrical enclosure after the enclosure has been installed in a hollow wall structure and wall panel material has been installed about the electrical enclosure without damaging the panel material.

BRIEF DESCRIPTION OF THE DRAWINGS

Other features of the present invention will be more readily understood from the following detailed description of specific embodiments thereof when read in conjunction with the accompanying drawings in which like reference symbols designate like parts throughout the Figures and in which.

DETAILED DESCRIPTION

Figure 1:
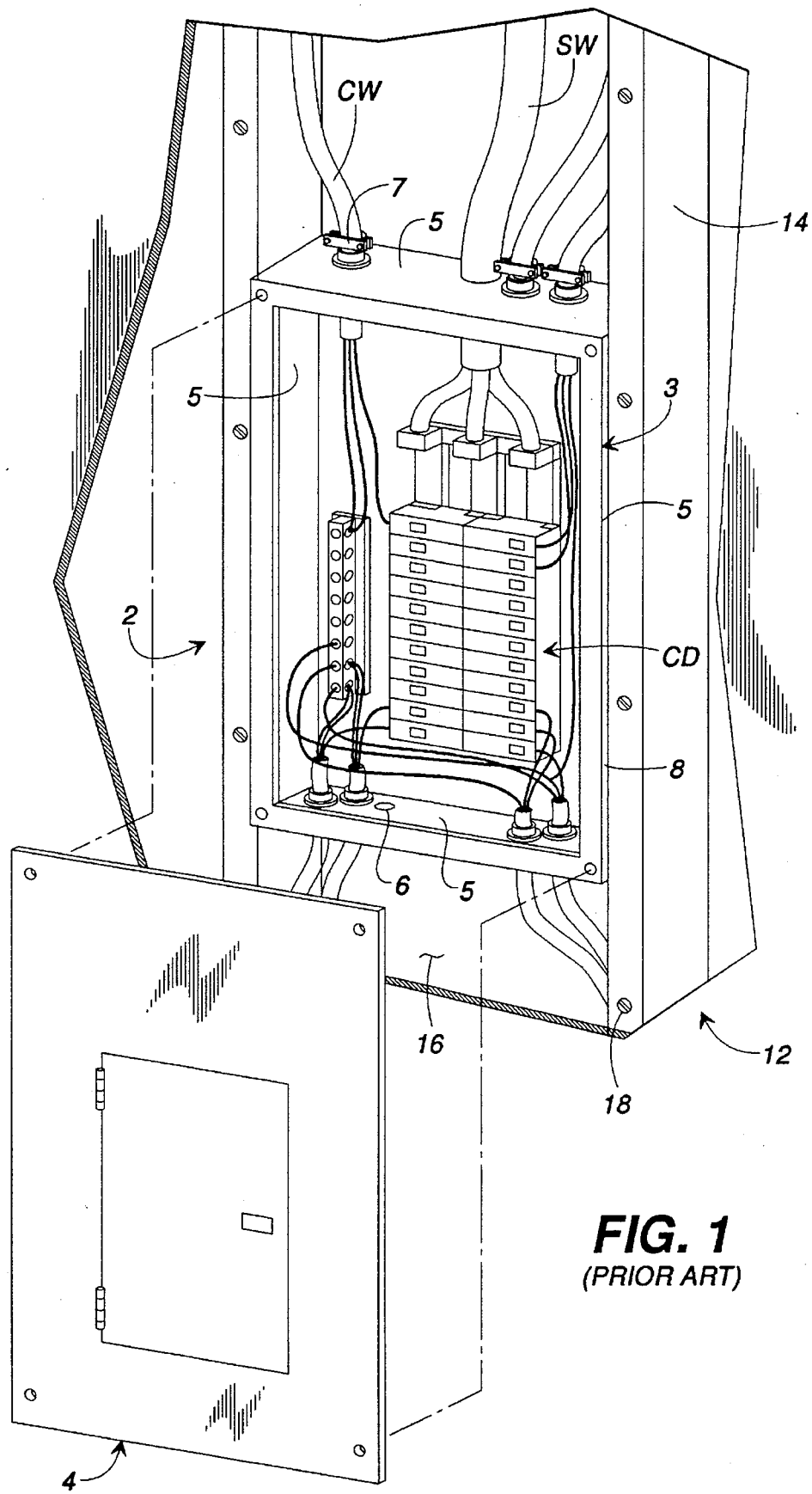
FIG. 1 is a pictorial view of a prior art load center mounted in a hollow wall structure.
Figure 2:
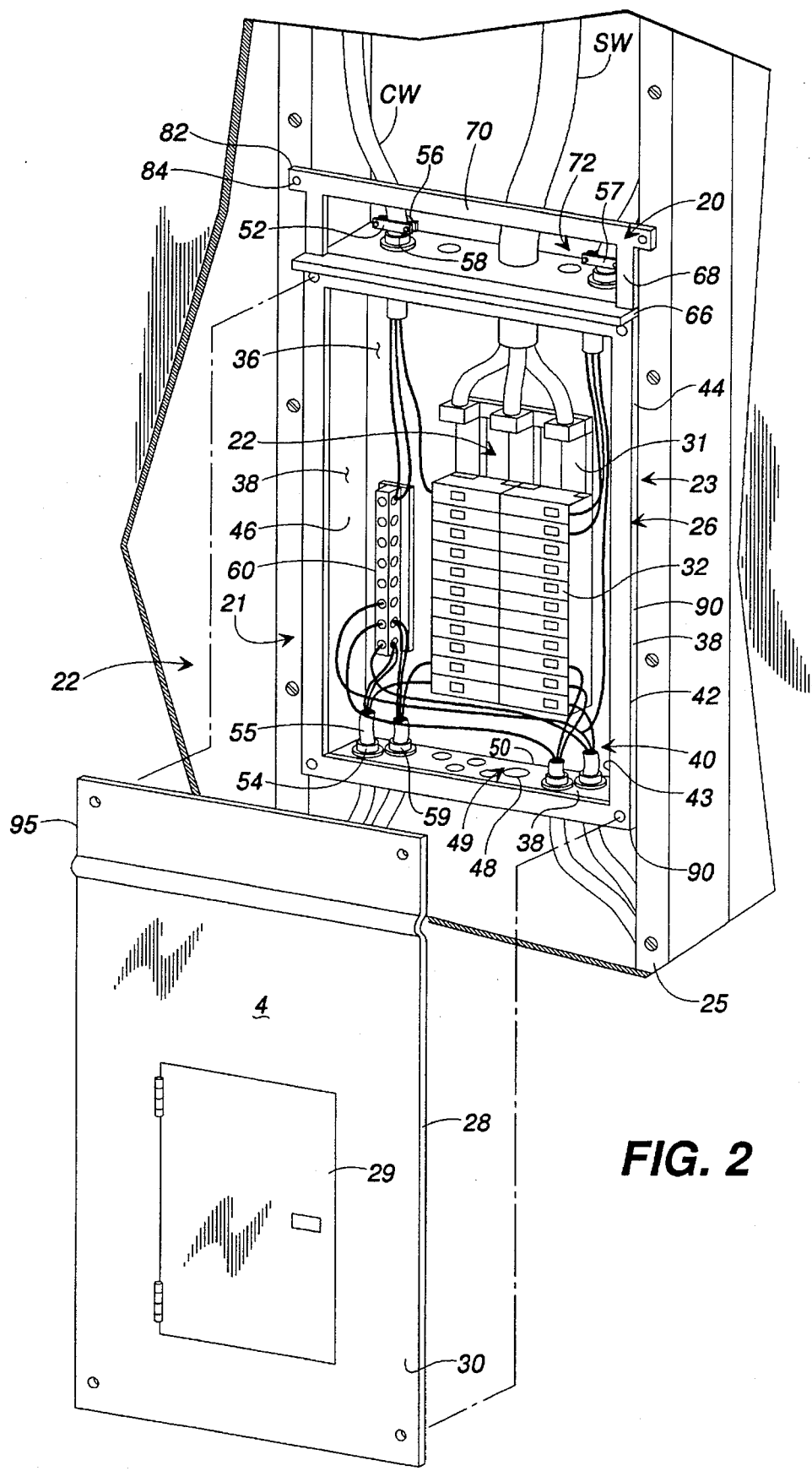
FIG. 2 is a pictorial view of a load center enclosure and access frame of the present invention mounted in a hollow wall structure.

Looking now at FIG. 2 there is shown an access frame 20 adapted to a load center 21 mounted in a hollow wall structure 22.

The load center 21 comprises an enclosure 23 and a power distribution assembly 24. The enclosure 23 is shown mounted between a pair of adjacent studs 25. The enclosure 23 comprises, generally, an enclosure box 26 and an enclosure cover 28 attachable to the enclosure box. The enclosure cover 28 includes a door 29 supported in hinged engagement with a door flange 30.

A high voltage/high current service wire, SW, originating at a utility pole or underground distribution service is terminated at the load center 21. The power distribution assembly 24 is electrically connected to the service wire SW. The power distribution assembly 24 includes power buss bars 31 and circuit breakers 32 mounted to the power buss bars. Circuit wires CW, typically comprising a power conductor, a grounding conductor and a neutral conductor all bound by a common sheath, extend from the electrical load center 21 to various locations in the building. The circuit wires CW are placed in protected electrical communication with the service wire SW through the circuit breakers 32. It is understood that circuit breakers 32 are shown for illustrative purposes only and without limitation of the present invention. Other protective devices, such as fuses, may be adapted for use with the load center 21.

The enclosure box 26 comprises a rear panel 36 and a plurality of sidewalls 38 attached to and extending perpendicularly from the rear panel 36 to form a box-like structure having an enclosure opening 40 which is covered by the load center cover 28. A typical enclosure box 26 is formed from a single sheet of sheet metal wherein the corners are notched and the sides bent at right angles to the sheet along a fold line 39 to form the enclosure sidewalls 38. The corners of the enclosure are secured to one another by welding or other means which are well known.

Figure 4:
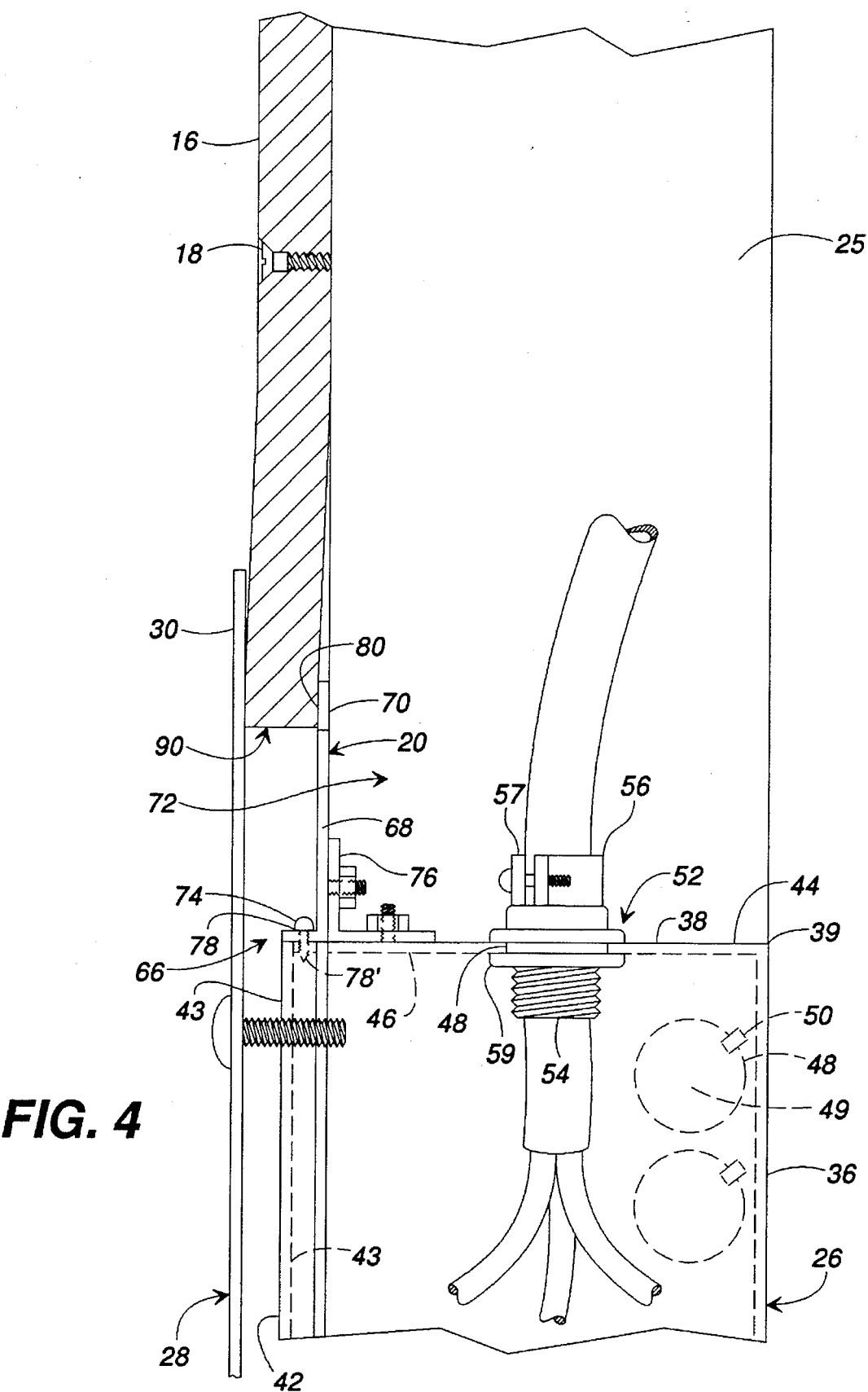
FIG. 4 is a side view of the load center shown in FIG. 2.

The sidewalls 38 include an edge 42 adjacent the enclosure opening and opposite the fold line 39. The edge typically includes a folded over lip 43 to strengthen the sidewalls against flexing and to provide a surface structure to which the cover 28 is attached. The enclosure box 26 is mounted in the hollow wall structure 14 such that the edge 42 extends past, the front facing surface of the stud 25, which is shown in FIG. 4.

The sidewalls 38 include an exterior sidewall surface 44 and an opposed interior sidewall surface 46. Knock-out apertures 48 are defined in the sidewalls 38 at various convenient locations and open to the interior and exterior sidewall surfaces, 44 and 46, respectively. Because the load center enclosure 23 may be used in a hollow wall structure or may be surface mounted, all of the sidewalls 38 are typically provided with knock-out apertures 48, even though many will not be accessible depending on the installation method. Thus, knock-out apertures 48 along the vertical sidewalls 38 will not be accessible because these sidewalls abut the studs 25 as depicted in FIG. 4. The horizontal sidewalls 38 of the enclosure box 26 shown in FIG. 2 are accessible, in that they do not abut a stud or other object.

Figure 3:
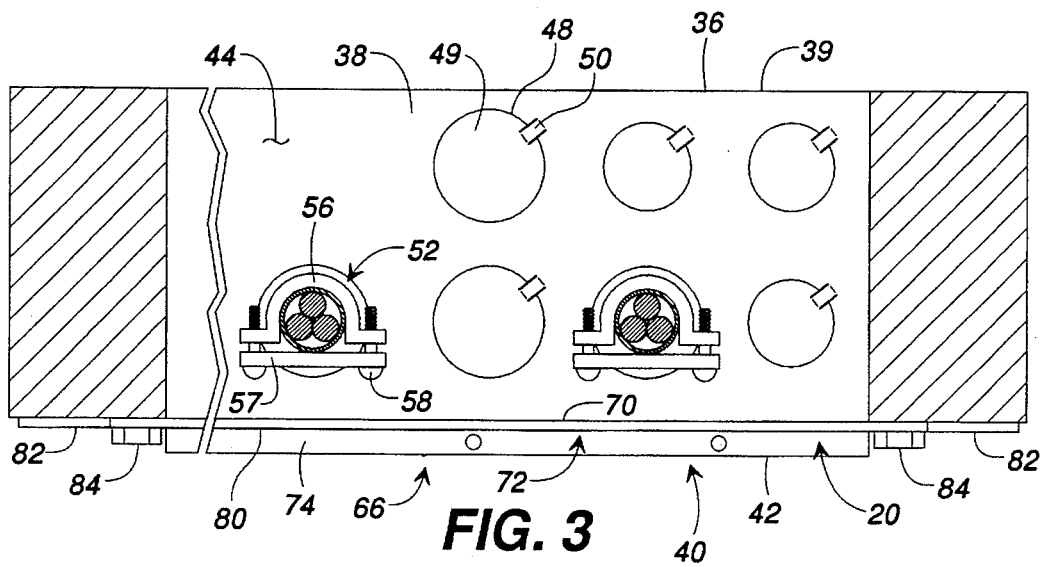
FIG. 3 is a top view of the load center shown in FIG. 2.

As best shown in FIG. 3, knock-out apertures 48 are incompletely formed apertures wherein a metal disc 49, called a "knock out," is held in place within the knock-out aperture by a bridging tab 50. The metal discs 49 are selectively removable by deflecting them so as to fatigue the bridge tab 50 thereby causing the bridge tab to break, allowing the metal disk to be removed. The knock-out disks 49 of unused knock-out apertures 48 are allowed to remain intact with the sidewall 38 until it is desired to install or "pull in" new wiring. During initial building wiring, an appropriate number of knock-out disks 49 are removed to provide access for the same number of circuit or service wire cables extending into or from the enclosure box 26.

A cable clamp 52 is secured within each of the knock-out apertures 48 intended to be used. The cable clamp 52 defines a passageway through which the wire cable passes. The cable clamps 52 include a threaded nipple end 54 which defines a passageway 55. A clamping anvil 56 is formed opposite the threaded nipple end 54. A clamp bar 57 is mounted to the clamping anvil by clamping screws 58.

The cable clamps 52 are installed in a knock out aperture 48 by inserting the threaded nipple end 54 through the knock-out aperture from the exterior sidewall surface 44. A locking nut 59 is threadedly engaged with the nipple end 54 and tightened against the interior sidewall surface 46 to secure the cable clamp 52 to the sidewall 38.

Wire circuit or service cable, SW and CW, are introduced into the enclosure box 26 by passing the cable through the passageway 55 of a cable clamp 52 and providing sufficient wire cable inside the enclosure box to allow hooking the wire to the circuit breakers 32 and a grounding bar 60. The clamping bar 57 is then urged into engagement with the circuit wire cable CW, for example, to immobilize the circuit wire cable CW with respect to the enclosure sidewalls 38.

Immobilizing the wire cable prevents damage to the wire due to vibration and prevents the wires from being pulled from the circuit breaker 32 which could damage the circuit breakers or upset the electrical connection of the wire with the circuit breakers.

The access frame 20 comprises a mount 66, opposed support legs 68 and a support bar 70. The mount 66 provides a means for mounting the access frame 20 to the enclosure box 26. The support leg 68 supports the support bar 70 in spaced-apart relation to the enclosure sidewall edge 42 thereby providing an access opening 72 opening adjacent the exterior sidewall surface 44 of the enclosure sidewall 38.

The mount 66 may be an integral flange mount 74 formed integrally with the support legs 68 and extending substantially perpendicular thereto. Alternatively, the mount may comprise a separate angle bracket 76, shown in phantom lines in FIG. 4. The flange mount 74, or the angle bracket 76 are provided with mounting apertures 78 which complement mounting apertures 78' formed adjacent the edge 42 of the sidewall 38. Fasteners, such as screws or rivets, are used to secure the mounting flange 74, or angle bracket 76, to the enclosure box 26. The access frame 20 is mounted to the enclosure box 26 such that a front support surface 80 of the support bar 70 is set back from the edge 42. The support surface 80 is adapted to support the wall panel 16 adjacent a panel opening edge as will be explained in more detail below.

The dimensions of the access opening 72 may be sized and configured as required for a particular installation and load center enclosure. In a preferred embodiment of the present invention, the dimensions of the access opening 72 are about equal to the width of the enclosure box 26, that is, about 15 inches, and about 1' to 3 inches in height.

The elongate support bar 70 extends from side-to-side of the enclosure box 26. In a preferred embodiment of the invention, opposed ends of the support bar 70 extend past the support legs 68 to form opposed stud engaging tabs 82. When the access frame 20 is attached to the enclosure box 26, the engaging tabs 82 extend to engage the forward facing stud surface. Nailing apertures 84 may be defined in the stud engaging tabs 82 to allow securing the engaging bar 70 to the studs 25 to enhance the engaging bar's rigidity. By securing the engaging tabs 82 to the studs 25, the engaging bar 70 is most effective at supporting the wall panel 16 which overlays the support bar along the support surface 80 after the wall panel 16 is installed. Supporting the wall panel 16 discourages unintended movement of the wall panel 16 which could lead to damage of the wall panel such as cracking.

In the preferred embodiment of the present invention, the access frame 20 is fabricated of stamped steel of a suitable gage to provide support for the wall panel 16.

The access frame 20 may be provided with the enclosure 23 as received from the manufacturer, ready for installation. Alternatively, the access frame 20 may be mounted to the enclosure box 26 by an installer in the field.

As explained above, building wiring of new construction is performed without the wall panel 16 in place. After the building wiring is completed, the wall panel 16 is attached to the stud wall structure 22. To install the wall panel 16 about the load center enclosure 23, a rectangular cut-out opening 90 is formed in the wall panel 16 and then the wall panel is set in place about the electrical enclosure 23. With respect to the load center enclosure shown in FIG. 2, wherein the access frame 20 is mounted at the top of the enclosure box 26 adjacent the upper horizontal sidewall edge 42, the vertical dimension of the cut-out 90 is sized and configured so that the upper horizontal edge forming the opening 90 overlays the support bar 70 without extending over, or covering, the access opening 72. The interior edges of the support bar 70 and the support legs 68 may be used as a pilot to guide a panel saw or other type of panel cutter to remove portions of the wall panel 16 that extend to cover portions of the access opening 72 because of imprecise measuring, or cutting, of the cut-out 90.

After the panel wall 16 has been installed about the enclosure box 26, the enclosure cover 28 is attached to the enclosure box. The effective planar dimensions of the load center enclosure includes, not only the enclosure box 26 but also the added dimensions of the access frame 20. Thus, in FIG. 2 the overall dimension of the load center 21 has increased due to the added height of the access frame 20. For safety reasons, and to present an attractive appearance, the enclosure cover 28 must cover the entire load center enclosure including the access opening 72, plus a sufficient overlap of the wall panel 16. Thus, with regard to the arrangement shown in FIG. 2, the enclosure cover 28 includes an extended flange 30 to cover the access opening 72 and a portion of the wall panel 16 above the access opening. Where the cover 28 originally received with the load center 21 is not sized to cover the access opening 72, a flange extender 95, depicted by phantom lines in FIG. 2, may be added to the flange 30 so that the cover covers the entire cut-out 90 opening and the access opening 72 and the enclosure opening 40.

When it becomes necessary to install additional new wiring in an existing building, wherein the building includes a load center 21 with an attached access frame 20, the installation is easily accomplished. The enclosure cover 28 is removed to expose the interior of the enclosure box 26, the power distribution assembly and the access opening 72. An unused knockout aperture 48 is selected and the knock-out disk 49 is removed. The knock-out disk 49 is removed by striking it with a screw driver to deflect it sufficiently so that it may be grasped by a pair of pliers and removed. The deflected disk may be grasped from within the enclosure box 26 or external the enclosure box via the access opening 72. Next, a suitable cable clamp 52 is attached to the upper sidewall 38 by inserting the threaded nipple end 54 into the knock-out aperture 48 from the exterior sidewall surface 44. This is conveniently accomplished by inserting the cable clamp 52 through access opening 72. The cable clamp locking nut 59 is threaded about the nipple end 54 from inside the enclosure box 26. The locking nut 59 is tightened by turning it with an appropriate tool while holding the clamping anvil 56 with pliers inserted through the access opening 72.

The end of the new wiring to be installed, which is located within the hollow wall structure 22 above the load center 21, is then inserted through the passageway 55 of the cable clamp 52. This is accomplished conveniently by the access above the enclosure box 26 provided by the access opening 72 of the access frame 20. The cable is secured by tightening the clamp screws 58 of the cable clamp 52 which are accessed through the access opening 72. The wiring installation is completed by re-installing the enclosure cover 28.

The mounting configuration of the load center 21 shown in FIG. 2 is a typical configuration of residential and some commercial buildings. This configuration is characterized by upper and lower sidewalls 38 that are accessible and readily adapted to the addition of new circuit wiring. The left and right sidewalls 38 are fully obscured, however, in as much as the studs 25 block any knock-out apertures that are located along the left and right sidewalls. Thus, it is often not necessary to provide access frames 26 along the left and right sidewalls 38. There may be times, however, where the left and/or right sidewalls 38 are adaptable for the purpose of pulling in additional wiring after the wall panel 16 is set into place. Under such circumstances the left and/or right sidewalls 38 may be provided with an access frame 20 to provide access for future wiring through the left or right sidewall.

Figure 5:
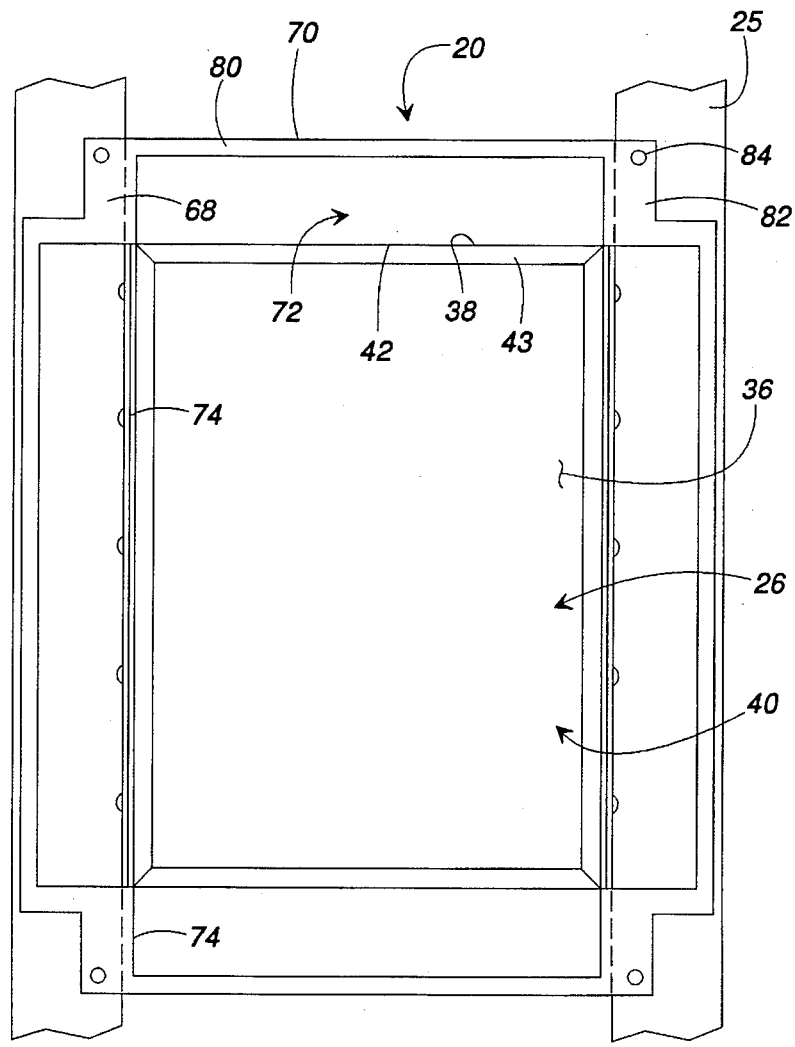
FIG. 5 is a front elevational view of an access frame adapted to an electrical enclosure providing access to the external surfaces of the electrical enclosure adjacent a plurality of enclosure sidewalls.

In a second embodiment of the present invention, shown in FIG. 5, the access frame 20 is adapted to provide access openings adjacent all four sidewalls 38 of the enclosure box 26. Here, the access frame 20 portion adjacent the studs 25 would simply go unused and, because they lay flat against the stud, will not interfere with the installation of the wall panel material 16.

While the present invention in its various aspects has been described in detail with regard to preferred embodiments thereof, it should be understood that variations, modifications and enhancements can be made to the disclosed apparatus and procedures without departing from the spirit and scope of the present invention as defined in the appended claims.

What is claimed is:

1. An electrical enclosure of the type used as a load center for building wiring in a hollow wall structure comprising a planar wall panel adapted to surround said electrical enclosure, said electrical enclosure comprising:

a rear panel;

a plurality of sidewalls defining sidewall edges, an interior sidewall surface, and an external sidewall surface, said sidewalls extending substantially perpendicularly from said rear panel to define an interior enclosure volume and an enclosure opening; and an access frame, said access frame comprising:

a frame mount adapted for mounting the access frame to the electrical enclosure;

an elongate support bar spaced from said frame mount; and at least one support leg connecting said elongate support bar to said frame mount, wherein said frame mount, elongate support bar, and at least one support leg define an access opening between said support bar and said electrical enclosure such that said support bar can support the planar wall panel adjacent the wall panel opening, said access opening being configured to provide access to said external sidewall surface externally of said electrical enclosure to facilitate installing wiring into said electrical enclosure.

2. The electrical enclosure of claim 1, further including an enclosure cover selectively attachable to said electrical enclosure for covering said enclosure opening and said access opening.

3. The access frame of claim 1, wherein the hollow wall structure with vertically arranged wall studs is adapted for supporting engagement with said electrical enclosure, said access frame further including support tabs extending from said elongate support bar, and a portion of the wall studs is adapted be covered by said support tabs in order to support said support bar.

4. The access frame of claim 3, wherein said support tabs define fastener apertures adapted to receive a fastener to secure said support tab to the stud with the fastener.

5. The apparatus of claim 1, wherein at least one of said electrical enclosure sidewalls includes a removable knock-out disc to provide an access aperture opening through the enclosure sidewall between the hollow wall structure and said enclosure volume, and said wiring access frame is mounted adjacent said enclosure sidewall including said removable knock-out disc.

6. The apparatus of claim 1 wherein at least one of said electrical enclosure sidewalls defines a wiring aperture formed in the sidewall, said wiring aperture opening between said enclosure sidewall interior and exterior surfaces thereby providing an opening through which wiring may pass from outside said enclosure to inside said enclosure volume, said access frame being mounted adjacent said enclosure sidewall defining said wiring aperture, said access opening of said access frame providing access to said sidewall, exteriorly of said electrical enclosure within the hollow wall structure, to facilitate adapting a wire retaining device adjacent said wiring aperture and to facilitate inserting wire through said wiring aperture and the wire retaining device.

\* \* \* \* \*